United States Patent
Salas et al.

(10) Patent No.: US 7,366,787 B2
(45) Date of Patent: Apr. 29, 2008

(54) DYNAMIC CONFIGURATION OF A CONTENT PUBLISHER

(75) Inventors: Jonathan C. Salas, Byron, CA (US);
Edwin J. Lau, San Jose, CA (US);
Prashant Navare, Fremont, CA (US);
Sanjeev Radhakrishnan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 160 days.

(21) Appl. No.: 11/286,694

(22) Filed: Nov. 23, 2005

(65) Prior Publication Data
US 2006/0168614 A1    Jul. 27, 2006

Related U.S. Application Data

(63) Continuation of application No. 09/877,761, filed on Jun. 8, 2001, now Pat. No. 6,983,479.

(51) Int. Cl.
*G06F 15/16* (2006.01)
(52) U.S. Cl. ..................... 709/229; 709/225
(58) Field of Classification Search .......... 725/23, 725/24; 709/201, 229, 225; 705/52, 59
See application file for complete search history.

(56) References Cited

U.S. PATENT DOCUMENTS

| | | | |
|---|---|---|---|
| 5,138,712 A | 8/1992 | Corbin | |
| 6,049,789 A | 4/2000 | Frison et al. | |
| 6,341,316 B1 | 1/2002 | Kloba et al. | |
| 6,453,420 B1 | 9/2002 | Collart | |
| 6,460,140 B1 | 10/2002 | Schoch et al. | |
| 6,553,412 B1 | 4/2003 | Kloba et al. | |
| 6,611,862 B2 | 8/2003 | Reisman | |
| 6,658,464 B2 | 12/2003 | Reisman | |
| 6,697,948 B1 | 2/2004 | Rabin et al. | |
| 6,718,328 B1 | 4/2004 | Norris | |
| 6,807,534 B1 | 10/2004 | Erickson | |
| 7,035,918 B1* | 4/2006 | Redding et al. | 709/223 |
| 7,155,415 B2* | 12/2006 | Russell et al. | 705/59 |
| 7,225,165 B1* | 5/2007 | Kyojima et al. | 705/59 |
| 2001/0032312 A1 | 10/2001 | Runje et al. | |
| 2001/0044781 A1* | 11/2001 | Shutes | 705/59 |

* cited by examiner

*Primary Examiner*—Krisna Lim
(74) *Attorney, Agent, or Firm*—Osha Liang LLP

(57) ABSTRACT

Content subscribers can dynamically activate content and content publishing resources that are distributed on a network. A content request from the content subscriber can engage a content locator in determining an appropriate content publisher to activate the content. Once the appropriate content publisher is found, the content publisher activates the content by presenting appropriate content publishing resources. Optionally, two more content publishers cooperate together to activate the requested content. Licenses to the content and content publishing resources are monitored to ensure that content publishers are compensated. System components, such as content subscribers, content locators, content publishers, are auto-configured during initial registration and dynamically updated if configuration parameters change. Optionally, a performance driver changes various configuration parameters of system components to ensure a desired performance during content activation.

15 Claims, 11 Drawing Sheets

DYNAMIC CONFIGURATION OF A CONTENT PUBLISHER

CROSS-REFERENCE TO RELATED APPLICATION

This application is a continuation of, and claims a benefit of priority under 35 U.S.C. 120 from copending utility patent application U.S. Ser. No. 09/877,761, filed Jun. 8, 2001, the entire contents of which are hereby expressly incorporated herein by reference for all purposes.

BACKGROUND INFORMATION

1. Field of the Invention

The invention relates in general to a distributed computing system, particularly to a system that allows users to subscribe and/or publish content on a network.

2. Description of Related Art

As more and more computers are connected via the Internet or a network such as an intranet or wide-area-network (WAN), resources such as databases, software applications, hardware devices, and electronic appliances can be shared among users within a network. Within this network system, resources are utilized in creating content such as reports, pictures, documents, databases, web-pages, and etc. Each type of content can be produced by various application tools and saved in various data formats. Thus, in order to share content created, "content subscribers," users or components that want to view or access content, either need to have all the resources required to view the content or have a converter that converts un-viewable data format to viewable data format. For example, in order for a Microsoft Office Suite user to view content created by a WordPerfect user, a converter is utilized to convert a Word Perfect file to a Word document. However, often various formatting attributes are lost in the conversion. Another approach is to have both Word Perfect and Microsoft Office Suite on ones' computer so that the user can view both file types. However, this is redundant and creates both a financial burden and occupies valuable memory space.

Similarly, a problem arises for "content publishers," users or components that want to generate the content, as each content publishing resource have different attributes that content publishers may want to utilize. For example, in creation of animation, software 1 may have good graphic capability while software 2 may have better simulation capability for rendering. In order to produce an animated scene, an animator may want to use the graphic capability of software 1 and the simulation capability of software 2. However, he may not have the resources to purchase both pieces of software or he may only need to use the software for a limited amount of time.

Therefore, it is advantageous to have an extendible and flexible system to allow content subscribers to share content and content publishing resources.

SUMMARY OF THE INVENTION

The invention enables content subscribers access to content and content publishing resources that are distributed on a network. The infrastructure for this system is a network, which enables content subscribers to communicate with content publishing components. The system allows for dynamic activation of content.

The preferred embodiment of this system comprises a content locator that enables a content subscriber to access an appropriate content publisher. A content request from the content subscriber will engage the content locator in determining the appropriate content publisher to activate the content. Once the appropriate content publisher is found, the content publisher activates the content by presenting appropriate content publishing resources. Optionally, two or more content publishers cooperate together to activate the requested content. Licenses to the content and content publishing resources are monitored to ensure that content publishers are compensated. System components, such as content subscribers, content locators, content publishers, are auto-configured during initial registration and dynamically updated if configuration parameters change. Optionally, a performance driver changes various configuration parameters of system components to ensure a desired performance during content activation.

DETAILED DESCRIPTION OF PREFERRED EMBODIMENT

Figure 1:
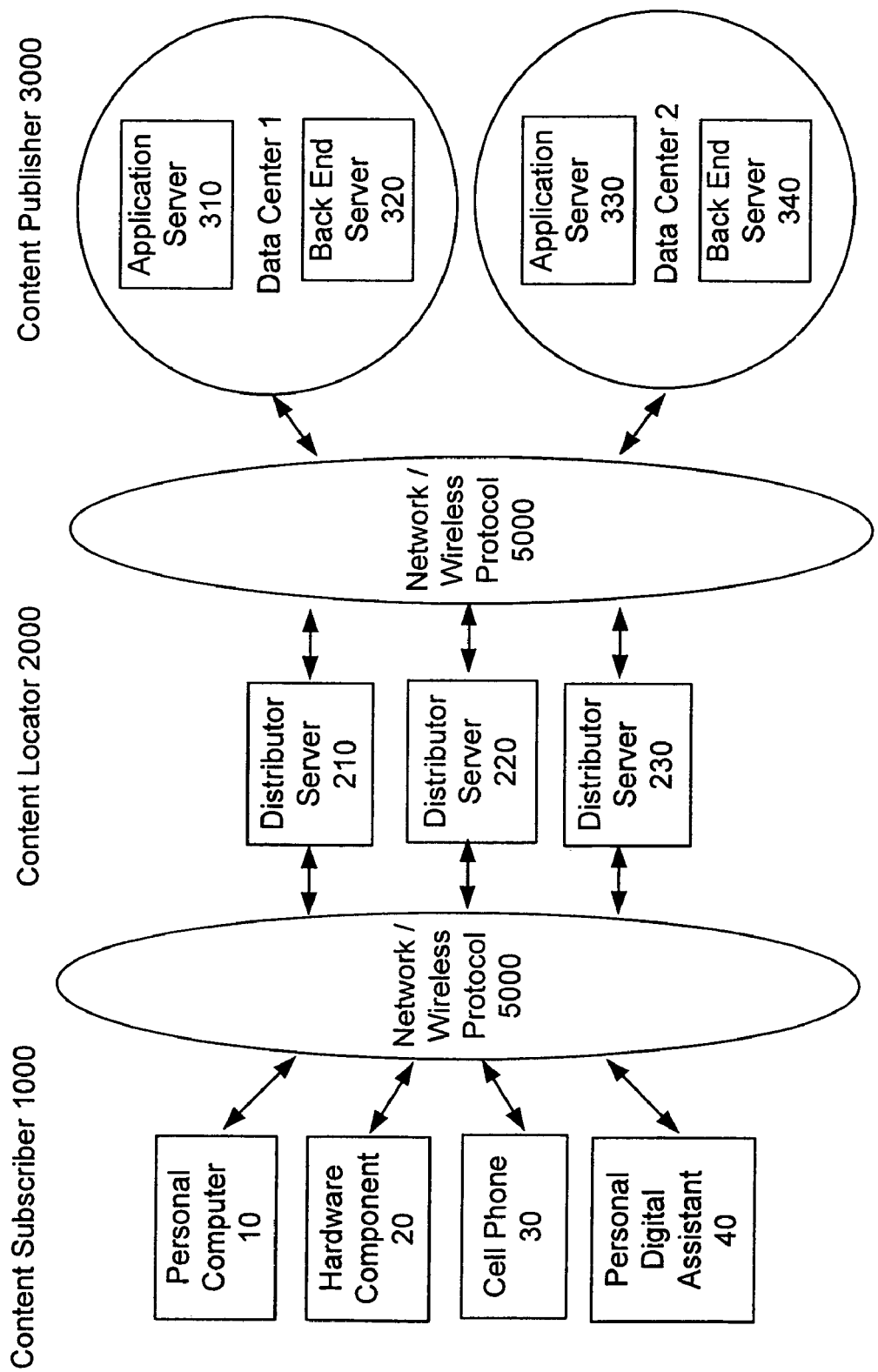
FIG. 1 is a block diagram of a content management system having system components: content subscribers 1000, content locators 2000, content publisher 3000, and a network/wireless protocol 5000.

The elements of the content management system in accordance with the invention can essentially be divided into three system components: content subscribers 1000, content locators 2000, and content publishers 3000 as illustrated in FIG. 1. The term "content subscriber" as described herein is defined as a component that requests content such as data files, text files, and graphic files, and content publishing resources, such as software application, memory, and computational power. The term "content publisher" as described herein is defined as a component that provides content and content publishing resources. The term "content locator" as described herein is defined as a component that locates an appropriate content publisher for a content request.

The system enables content subscribers, such as a personal computer 10, hardware component (e.g. printer, memory, monitor, and etc.) 20, cellular phone 30, and personal digital assistant (PDA) 40, to share content and content publishing resources, such as application servers 310 330 and back end servers (e.g. storage, computational power, and etc.) 320 340 on a wire or wireless network. As content and content publishing resources become more distributed, numerous attributes, such as content subscriber and content publisher relationships, content licenses, and content publishing resource parameters, need to be managed. Thus, without a robust content management system, content subscribers cannot share content or resources among themselves.

In the preferred embodiment, the system is used in a "software as a service" (SAAS) model, in which software applications reside on servers, and clients share and access the applications from the servers via a network. Examples of users of the SAAS model are "application service providers" (ASPs) and corporate information technology (IT) organizations that deliver centralized applications via a network. However, one skilled in the art should realize that the resource could be any software or microprocessor machine that can execute a computing task, such as a printer, a web-content server, or a database.

Figure 2:
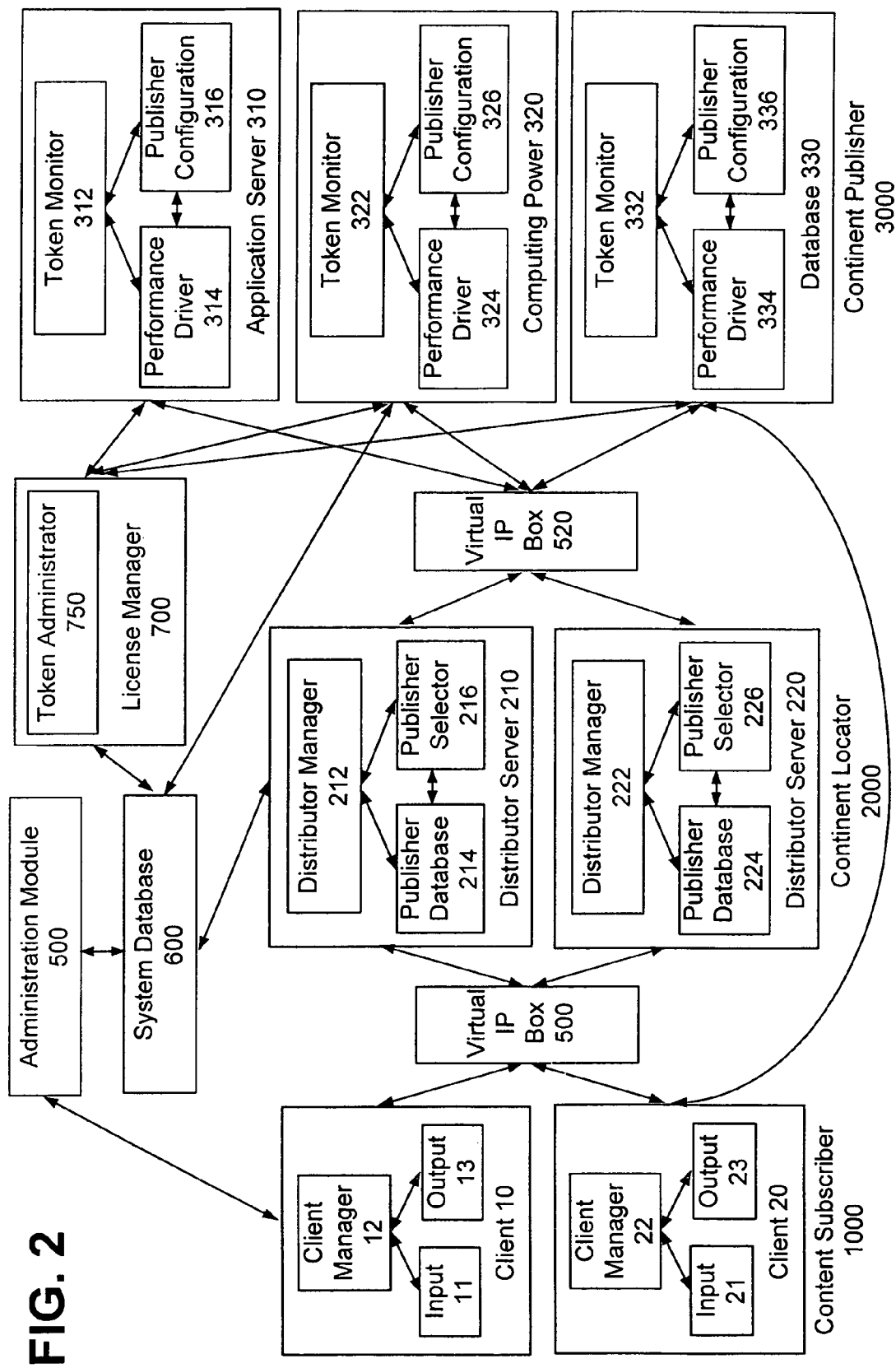
FIG. 2 is a more detailed block diagram of the content management system.

Referring to FIG. 2, which provides a more detailed diagram of the system components of the content management system, all components of the system (content subscribers 1000, content locators 2000, and content publishers 3000) are connected to the system via registration through the administration module 500 and stored in a system database and/or directory service 600. The client component of a personal computer 10 comprises an input module 11 to request a resource, a client manager 12 to track input and output data, and an output module 13 to present content or a content publishing resource. Client 10 communicates to the other components of the system via a network such as the Internet, a local area network (LAN) and/or wide area network (WAN), wireless and/or wired, or other network communication infrastructure.

After registration of each component, each component is configured according to its specific parameters set by a system administrator. For example, an application server 310 that is supposed to run software 1 will need to be up-loaded with software 1. In previous systems, each component needs to be manually configured accordingly to the parameters set by the system administrator. In a preferred embodiment of the invention, the configuration of the system component is accomplished dynamically by setting up a central configuration database and/or directory service, which cooperates with a publisher configuration component 316 to configure the system component. This auto-configuration process is furthered illustrated in FIG. 3a-3b below.

Figure 3A:
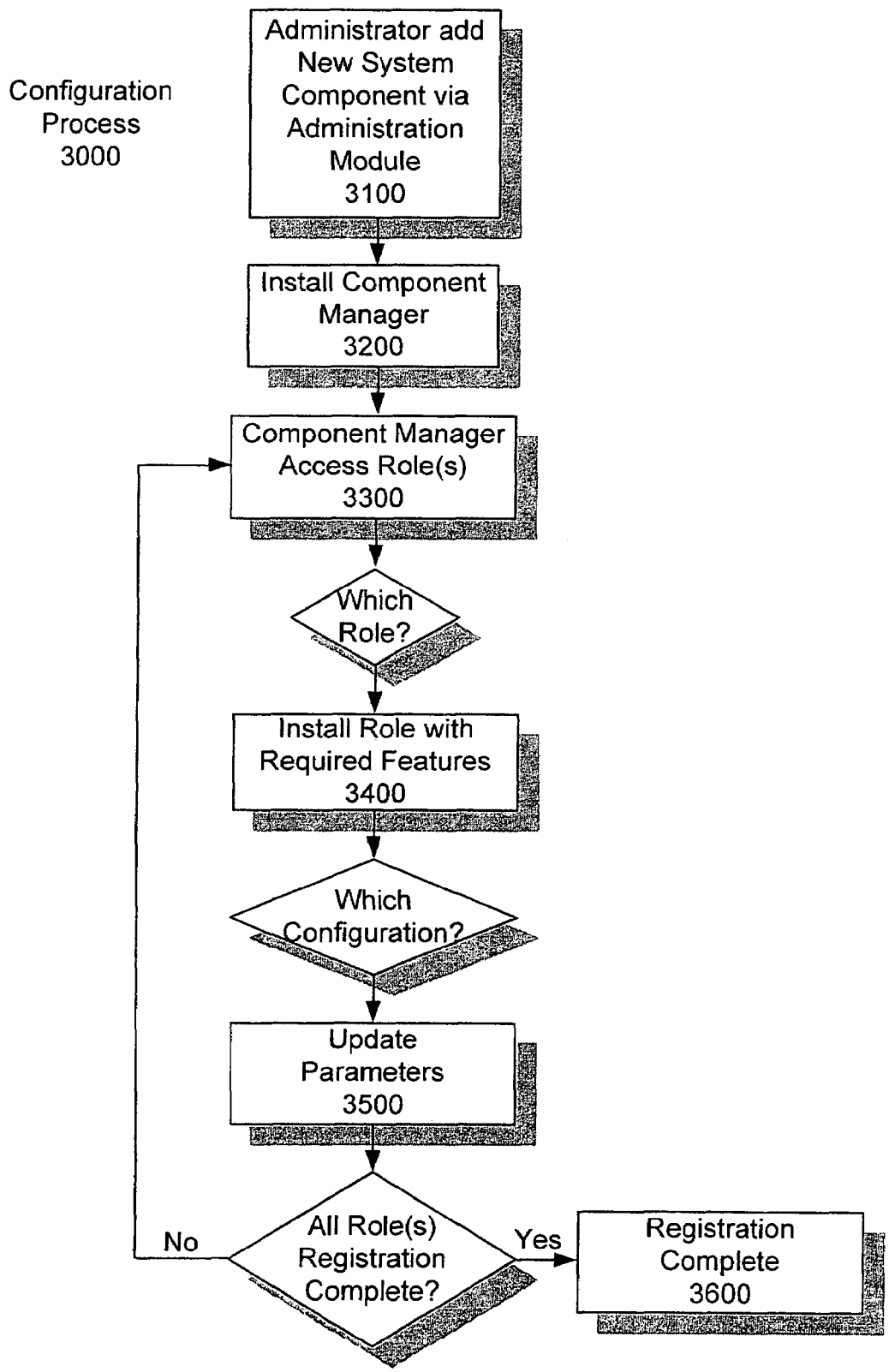
FIG. 3*a* is a logical flow chart that describes a process for system component configuration.
Figure 3B:
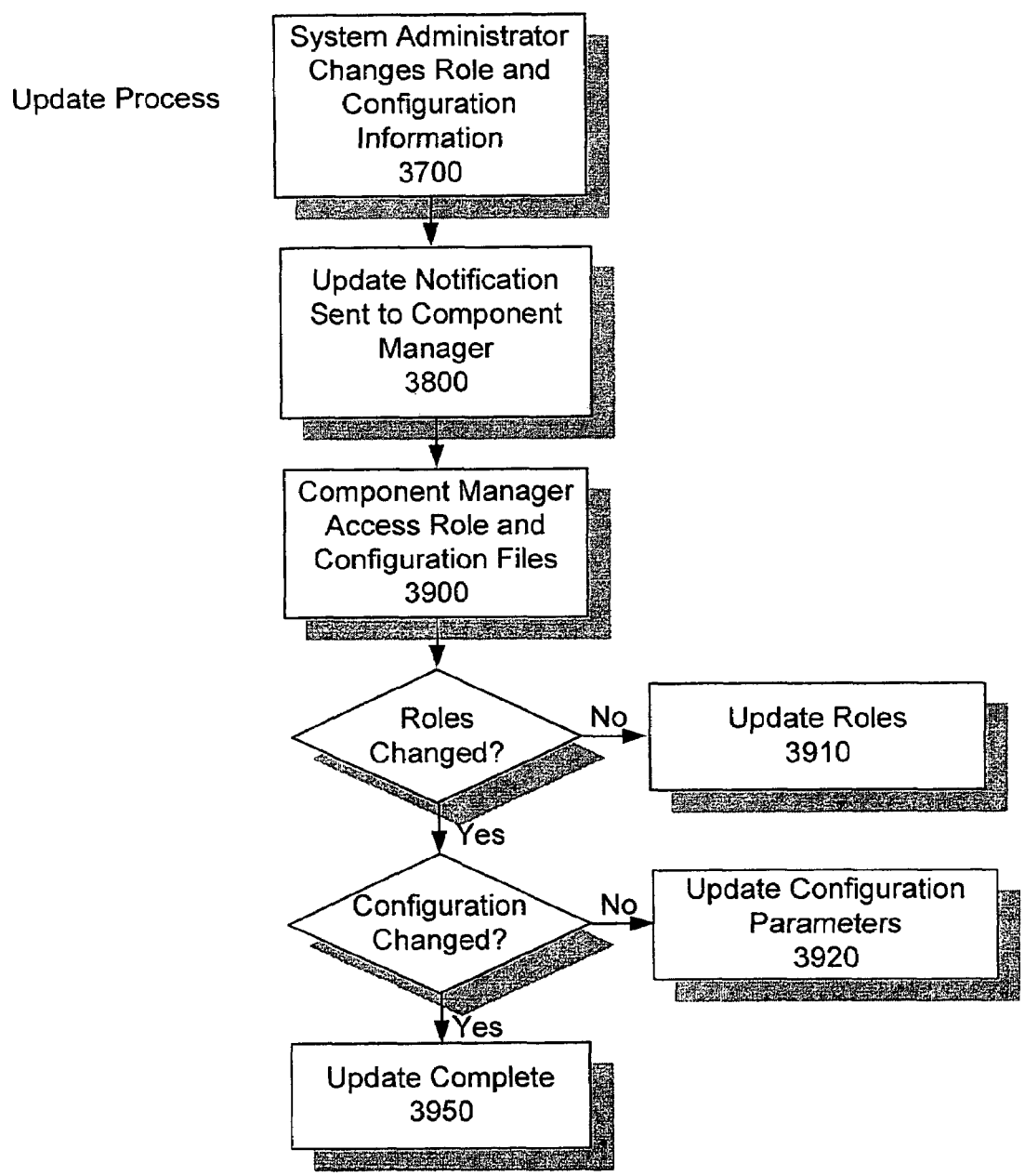
FIG. 3*b* is a logical flow chart that describes a process for updating configuration parameters.

In FIG. 3a, an auto-configuration process is illustrated and FIG. 3b shows an update process after initial registration. Referring to FIG. 3a, the system administrator adds new system component via administration module 3100 by assigning role(s) to the system component. A component manager is installed onto the system component 3200. The component manager on the system component will access information regarding the role(s) in the central configuration database and/or directory service 3300. For each role, the component manager downloads the required features associated with the roles 3400. For example, if the system component is a content locator component, then required features such as a distributor manager 212, a publisher database 214, and a publisher selector 216 will be downloaded onto the system component. If the system component is a content publishing component, such as an application server 310, then all the applications associated with the server are downloaded onto its operating system. Alternatively, the system administrator can upload the roles and its associated parameters onto the system component.

After installing the features associated with the role, configuration parameters are accessed and parameters are updated 3500. For example, the server 310, which has software 2 that requires computational power X, will have its computational power set as X to ensure that software 2 will run properly. If all the role registration and configuration is complete, registration is complete 3600. If all the role(s) are not registered, the component manager will continue to access role(s) until all roles are registered.

After registration of each system component, subsequent updates of the system component parameters are accomplished via the update process as illustrated in FIG. 3b. When a role or a component parameter changes, the system administrator changes the role and configuration information in the central configuration database and/or directory service 3700. An update notification is sent to the component manager 3800 and the component manager accesses the central configuration database and/or directory service 3900. If roles have changed, the component manager updates roles by adding or deleting roles 3910. If configuration parameters have changed, the component manager updates parameters 3920. After updating roles and configuration parameters, the update process is complete 3950.

Figure 4:
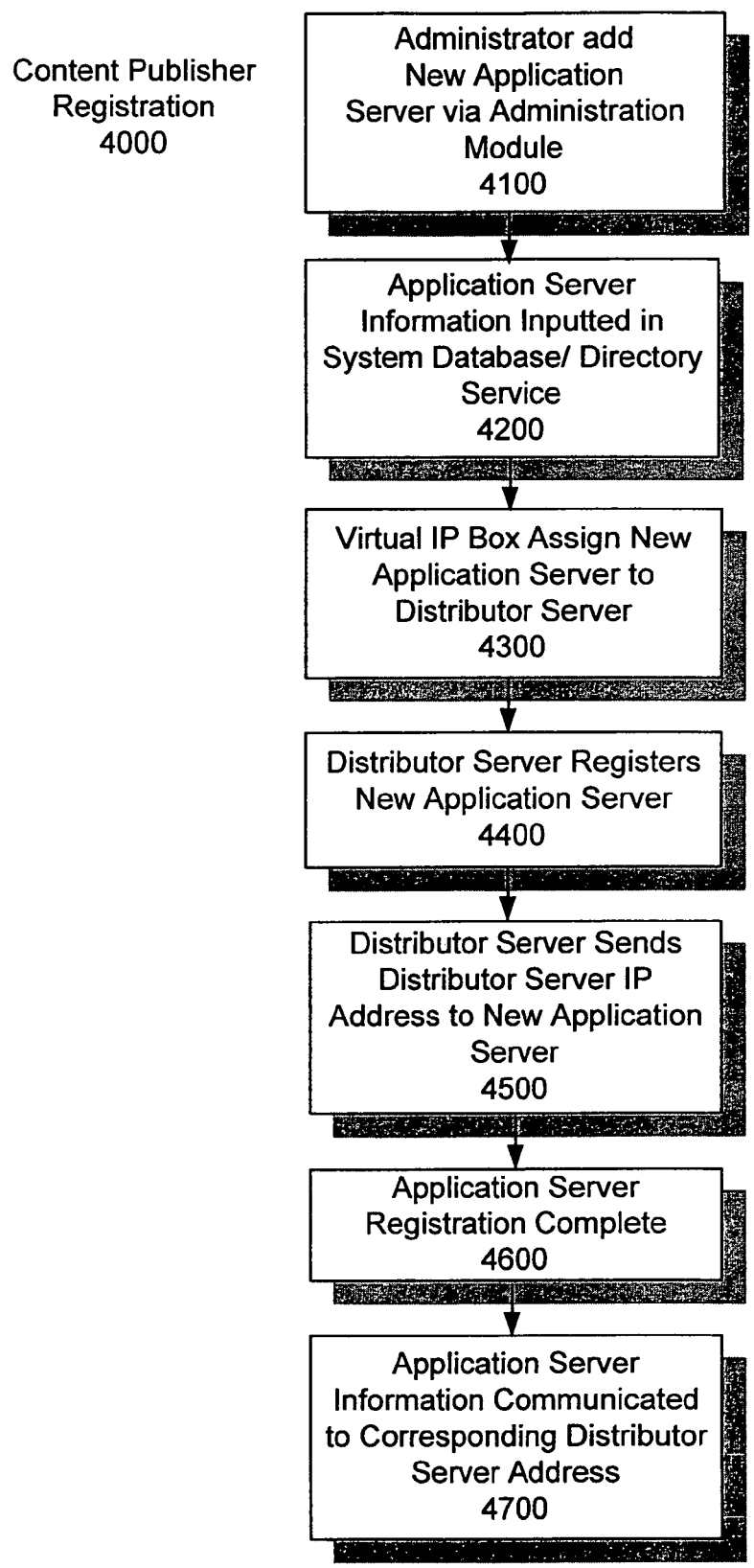
FIG. 4 is a logical flow chart that describes a registration process of a content publisher.

After configuring each system component, each content publisher and its various parameters need to be registered in the system database and/or directory service via a content publisher registration 4000. Referring to FIG. 4, if the content publisher is an application sever, the administrator adds new application server 310 via administrator module 4100. After application sever attributes are recorded in the system database and/or directory service 4200, a virtual IP box 520 assigns the new application server to a distributor server 4300. The virtual IP box 520 allows for an identification of a set of distributor servers with a single IP address and maps a single address for, all distributor servers to an address of a particular distributor server. Thus, at initial registration, the new application server does not need to know the IP address of the particular distributor server. In step 4400, a distributor manager 212 registers the information in a publisher database 214 and sends 4500 its "distributor server IP address" to the application server 310. After completion of registration 4600, the application server 310 sends 4700 its attributes to distributor server 210 directly via the "distributor IP address," and attributes in the publisher database is dynamically updated.

Figure 5A:
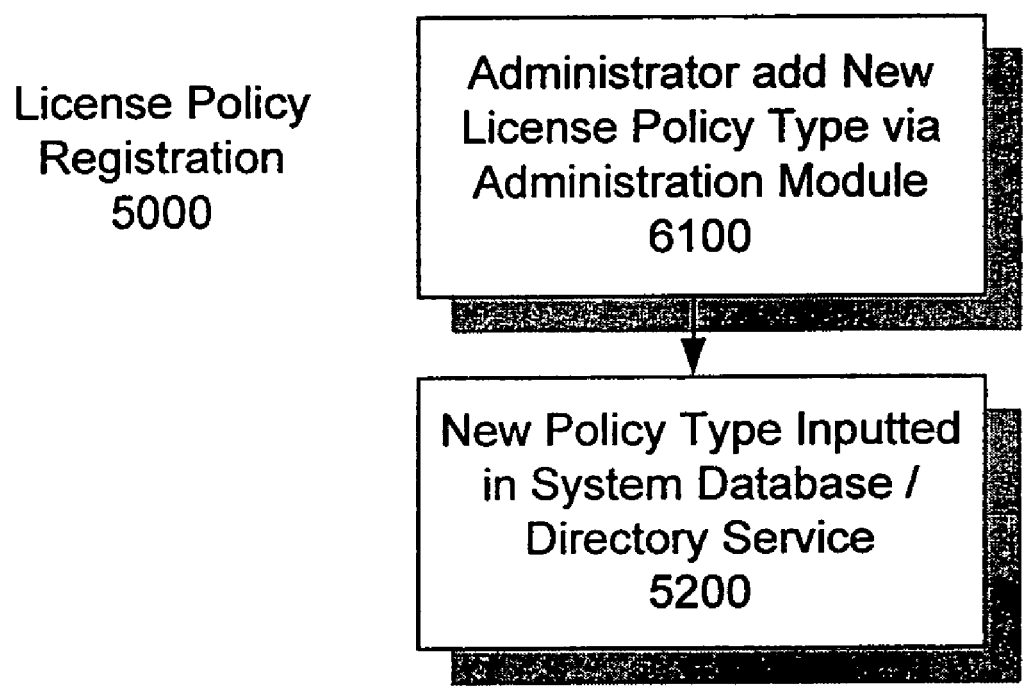
FIG. 5*a*-5*b* is a logical flow chart that describes a license policy registration.
Figure 5B:
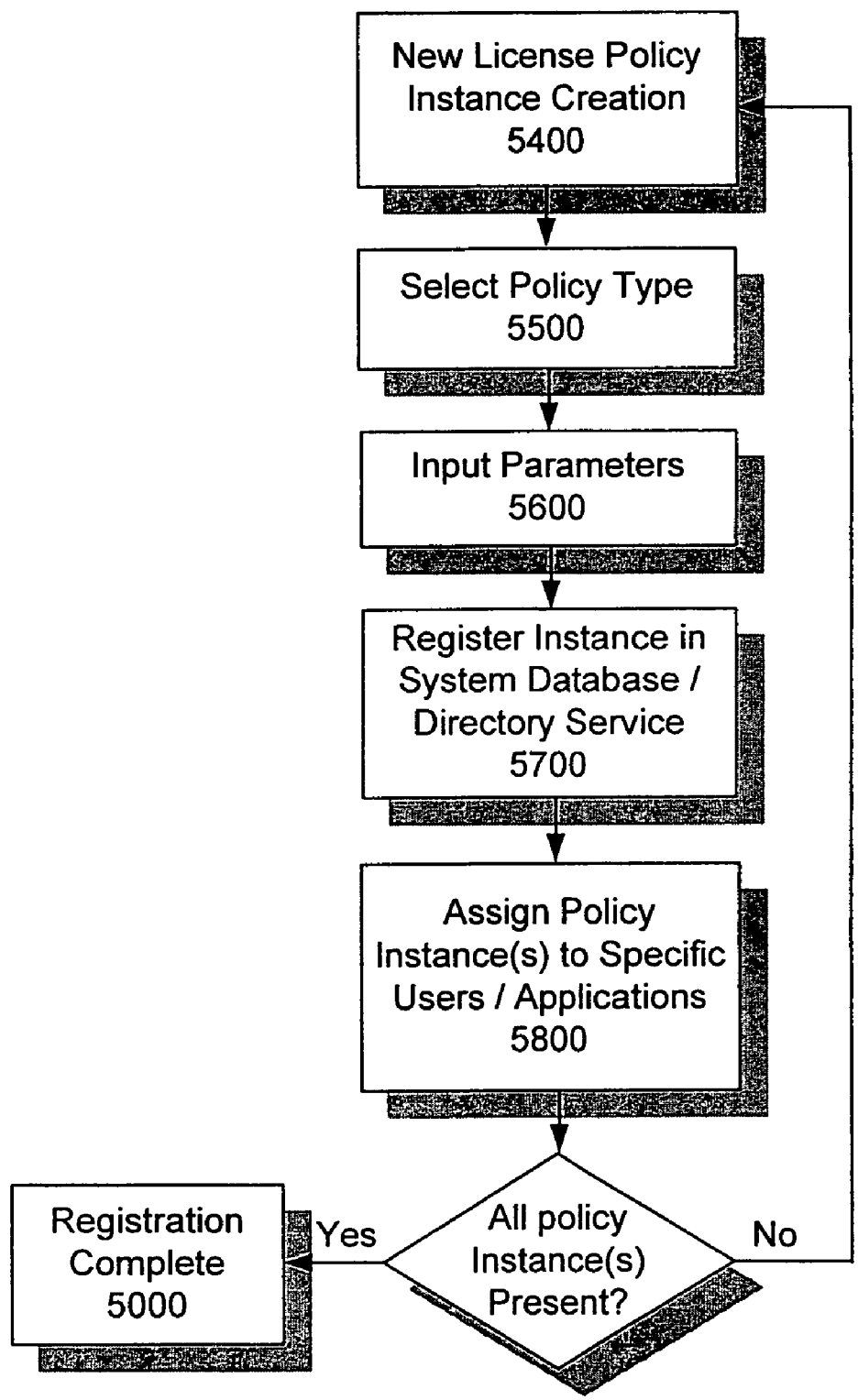

In addition to the registration of each component to the system, various policy license types such as by user, by usage, by client, by time, by date, by resource are registered into the system database and/or directory service 600 via administration module 500, which is furthered illustrated in FIG. 5a-5b.

FIGS. 5a-5b describe a process for a license policy registration 5000, particularly to an application license in an ASP model. In the initial registration as shown in FIG. 5a, a system administrator will add new license policy types with associated parameters such as by user, by resource, by time, by task priority, and by time 5100. For example, a by time policy type monitors access based on a time specified such as the month of March. Associated parameters relating to each policy type are entered into the system database and/or directory service 5200, which allows re-use of parameters commonly associated with such policy type.

Referring to FIG. 5b, specific "user access sessions or policy instances" are created for each criterion of a license policy. The term "user access sessions or policy instances" as described herein is defined as allocated user access associated with a set of licensing criteria. For example, a policy license type that permits access by usage can be selected and furthered modified to create a policy instance 1 for user A with parameters including 10 hours of usage, during the month of March, to application server 600, on Monday thru Friday, and no more than 2 hours per day. For each criteria or a combination of criteria, a specific policy instance is created to reflect the criteria. Thus, if user A also has access to application server 600 on Saturday thru Sunday, a policy instance 2 may be created with parameters including "access to application 600" and "on Saturday thru Sunday."

In an alternative embodiment, policy instance(s) can be created for each resource. For example, if the application server 700 can be accessed only on Saturday and by authorized managers, the application server 700 would have an associated policy instance 3 with parameters including "Saturday access" and "by authorized managers." Since each criteria and combination of criteria can be added to common policy types to create policy instances, the system is able to handle different licensing policies and relationships among users. Optionally, secondary policy instances or any additional policy instances (e.g. 10 minutes of usage billed separately, extra number of files produced, extra number of pages printed, and etc) are provided and assigned to users so that if the initial policy instances are depleted, users can utilize these additional resources to complete their current work. Also, these additional policy instances can be utilized in priority schemes. For example, if a license policy is that a user C accesses server 500 before accessing server 600, user C will have an initial policy instance with parameter, "access server 500," and a secondary policy instance with parameter, "access server 600." In the above example, user C will deplete his access to server 500 before accessing his access to server 600.

In FIG. 5b, new policy instances are created for each user 5400 by selecting policy type 5500 and then modifying each policy type by adding user specific parameters to create policy instances specific to each user 5600. For example, if user B's license policy is usage in the month of March and only access from 9:00 am to 5:00 pm, a policy instance 3 is created by adding the user specific parameters, "from 9:00 am to 5:00 pm," to by time policy type, "Month of March," specified above.

Additionally, new policy instances can be created for each resource. For example, the server application 500 can have a policy instance 4 that specifies by user policy type with application specific parameters such as "Monday Access." All created policy instances are stored in the system database and/or directory service 5700 and assigned to specific users or applications 5800. If all policy instances associated with user/resource are present, registration is complete 5900. If all policy instances are not present, new policy instance creation process iterates until all policy instances associated with user/resource are created and assigned.

Figure 6:
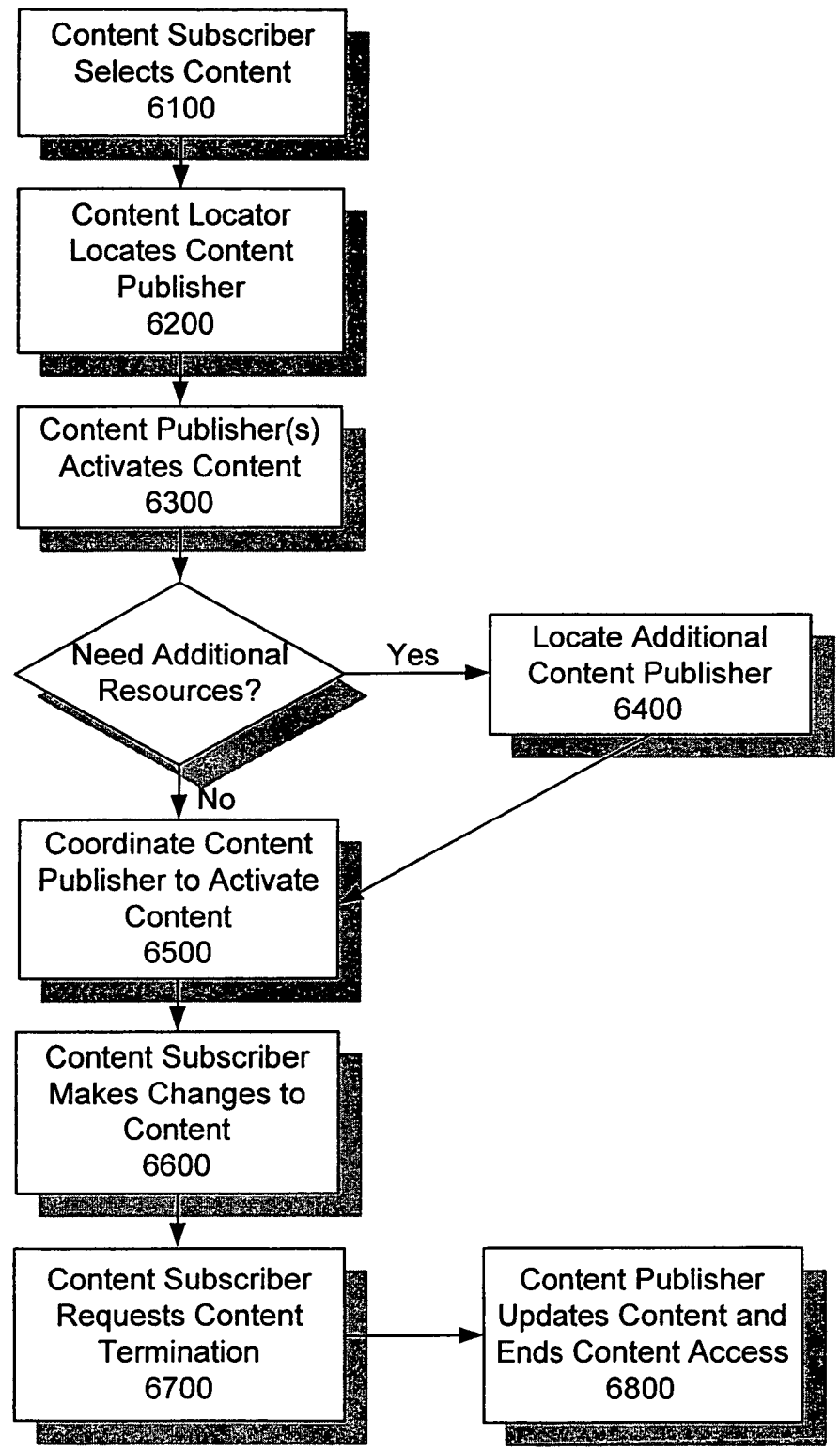
FIG. 6 is a logical flow chart that describes a process for dynamic activation of content.

After registration and assignment of license policies to each user, referring to FIG. 6, which illustrates the dynamic content activation process of the content management system, a user utilizes the content subscriber 10 to select a content 6100. One of the content locators locates 6200 the appropriate content publisher, such as application server 310 that has an application to present the content. For example, if user selects a file that contains data in an Adobe acrobat format, the content locator will locate an application server that has Adobe acrobat. Additionally, various content subscriber attributes, content attributes, content publisher attributes are considered in locating the appropriate content publisher, such locator process is furthered described in FIG. 7.

Once the appropriate content publisher(s) are located, content publisher activates content 6300 by serving up the content publisher resources or presenting the content. If additional resources are needed, content locator will search for additional resources 6400. Once all content and resources are located, content publishers are coordinated to provide the required resources to present the content 6500. Equipped with the content and the content publisher resources, the content publisher can create or change content 6600. When the content subscriber wants to end a session, the content subscriber can request content termination 6700. Then, the content publisher updates content and ends content or content resource access 6800.

Figure 7:
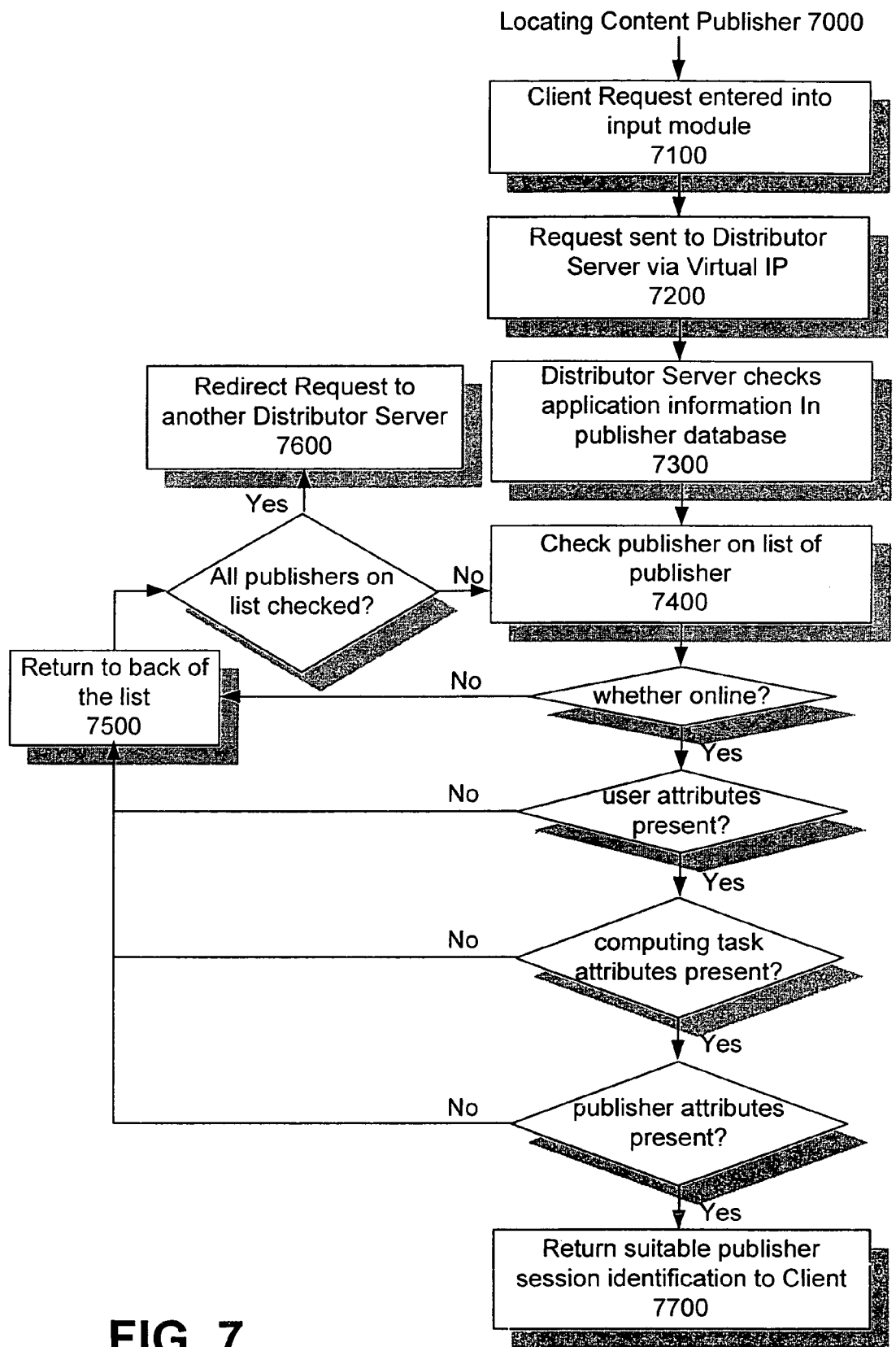
FIG. 7 is a logical flow chart that describes a process of locating an appropriate content publisher.

Referring to FIG. 7, a process in locating an appropriate content publisher such as an application server is illustrated 7000. Client request is entered into the input module 7100 and client manager directs the request to the virtual IP box 500. The virtual IP box redirects the request to a distributor server 7200 and the distributor manager checks application information in publisher database 7300. The distributor manager checks a first server on a list of servers with the requested application 7400. If the first server is active and online, the server is checked to see whether it has the required user attributes. As described herein, the term "user attributes" include "user preferences," such as data format, file size, detail of image, security settings, and "client attributes" such as client computing power, client memory, client visualization, client software, and client network connectivity. Then, the server is checked to see whether it has the required computing task attributes, such as requisite computing power and requisite memory for the computing task. The server is also checked to see whether it has the required publisher attributes, such as requisite application type, system software, total computing power, graphic processing, active computing power, idle computing power, file system accessibility, database accessibility, and network utilization. If the server has all the user attributes, all the computing task attributes, and all the publisher attributes, the server is a suitable server and the IP address of the server is sent to the client 7700 so that the client can access the application directly via the server IP address. If the server does not contain all the attributes, the distributor manager returns to the list of servers that contained the requested application 7500 and checks another server 7400. If all servers on the list are checked, the request is directed to another distributor server 7600.

Figure 8:
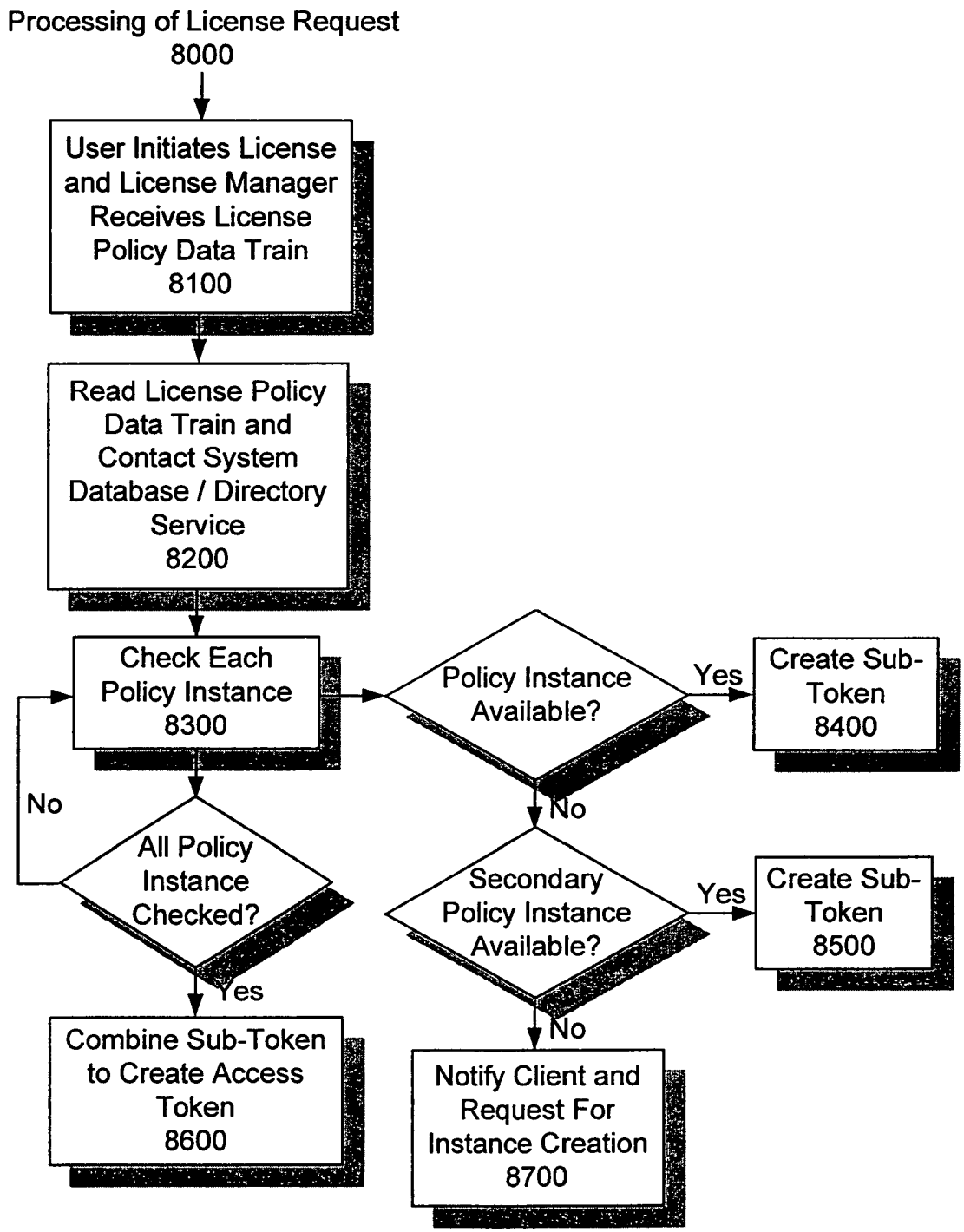
FIG. 8 is a logical flow chart that describes a license policy administration process.

After locating the appropriate content publisher, a license policy administration process 8000, as illustrated in FIG. 8, is utilized to ensure that content publishers are compensated for providing content or content publishing resources to the content subscriber. The user initiates license requests and a license manager receives policy data train 8100. The term "license policy data train" as described herein is defined as a list of policy instances. The license manager reads the license policy data train and contacts system database and/or directory service 8200 to check each policy instance for availability 8300.

If a policy instance is available, a token administrator 750 of a license manager 700 creates a sub-token, which enables access to the resource. Since each policy instance is associated with a specific parameter, a user is allowed access when each sub-token corresponding to each policy instance is present. For example, if the license policy is that a user E has access to server 310 on Monday for one hour, user E will need to submit three sub-tokens, one for "server 310", one for "Monday," and one for "one hour." Alternatively, each sub-token may be associated with a policy instance that has a plurality of criteria. For example, instead of 3 sub-tokens, user E may provide one sub-token for an hour access on Monday and one sub-token for server 310 access. By dividing a complicated license policy into separate policy instances, each instance needs only to monitor its own access, and numerous combinations of instances can be created to reflect any license policy. Additionally, sub-tokens associated with a policy instance can allow access to only a portion of the resource access allocation. For example, if the policy instance provides 100 minutes of access, the sub-token created can allow access for 10 minutes and when the sub-token expires, another sub-token will be created if additional minutes remain in the policy instance. This eliminates the requirement to monitor the usage of the user on the client side.

After checking all policy instances and if all policy instances are available, the sub-token(s) created in step 8400 are combined into an access token and is returned to client 8600. The term "access token" as described herein is defined as an aggregate of the sub-tokens associated with a policy data train. If a policy instance is not available, secondary or additional policy instances are checked for availability. The term "secondary or additional policy instances" as described herein is defined as additional allocated access sessions. For example, a user can purchase an emergency reserve so that if his initial access is depleted, he is able to tap into this emergency reserve to complete his work or save work to persistent storage. If there are secondary policy instances available, sub-tokens corresponding to the secondary policy instances are created and sent to client 8500. If no secondary policy instances are available, the client is notified that access is depleted and a request for new policy instance creation is made 8700. Additionally, a notification of time to create new policy instances can be sent to client when access is reduced to a certain level.

Figure 9:
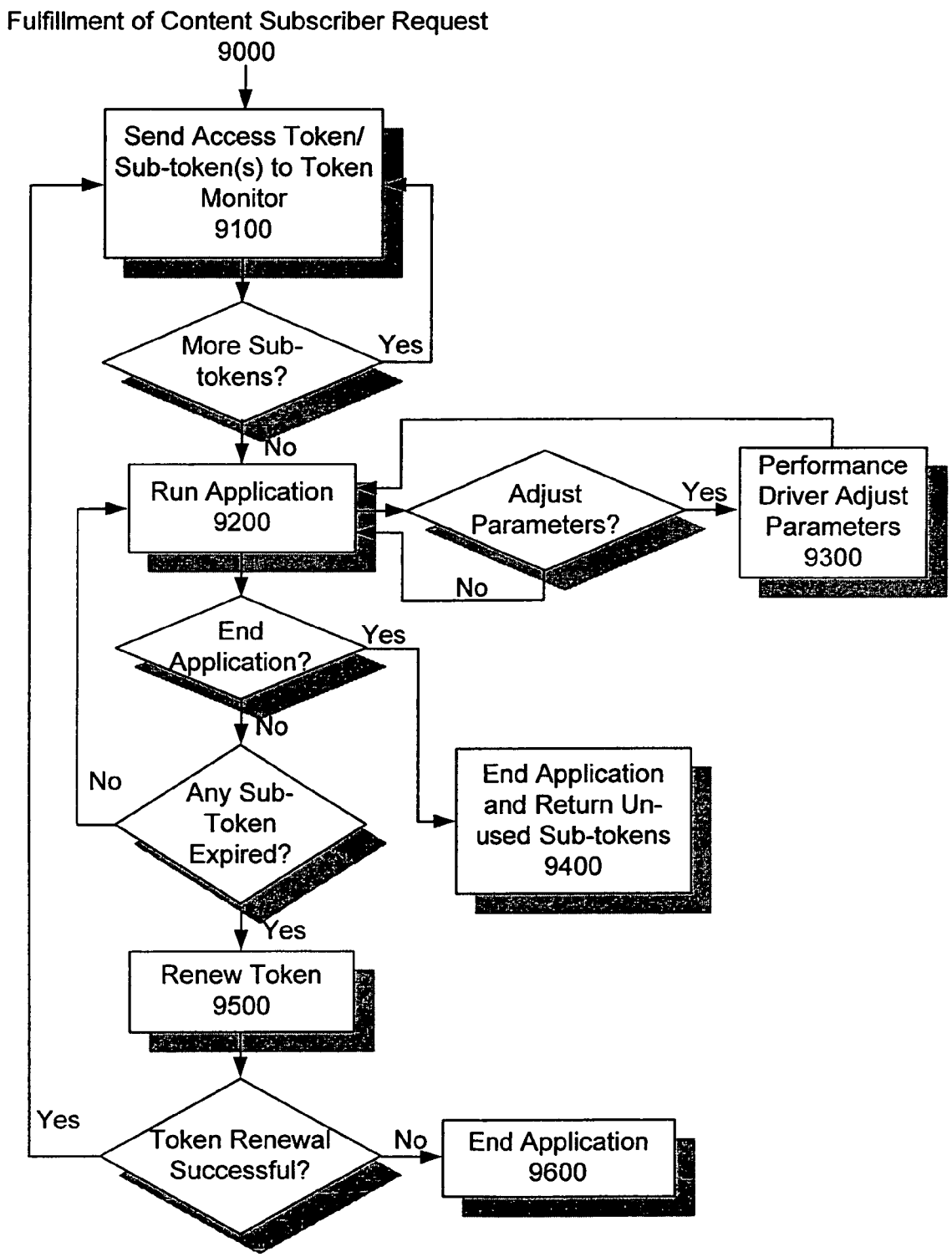
FIG. 9 is a logical flow chart that describes a process for content subscriber request fulfillment.

FIG. 9 describes the process for fulfilling a content subscriber's request for content or a content publisher resource 9000. After the processing of the request and creation of sub-tokens, as illustrated above in FIG. 8, the content subscriber request is sent to the content publisher located by the locator process in FIG. 7. The client sends 9100 the access token to a token monitor 312 of the application server 310, which checks to see whether there are any more sub-tokens required to allow access. If there are additional sub-tokens, the sub-tokens are sent to the token monitor until there are no more sub-tokens. When all required sub-tokens are sent, the token monitor activates the content such as running an application 9200. During activation of the content such as operation of the application, a performance driver 314 monitors the configuration parameters in the content publisher. If parameters need adjustment, the performance driver will adjust 9300 the parameters to ensure that the activation of the content complies with a performance level.

If user requests to end the application, an application terminator ends the application and access allocation remaining on the sub-token(s) is returned to the system database and/or directory service 9400. If user continues to run the application, the token monitor initiates application via an application initiator 9200 until a sub-token expires. When a sub-token expires, the token monitor renews the sub-token 9500. If renewal is successful, a sub-token is created and sent to the token monitor 9100 and the fulfillment process reiterates 9000. If renewal is not successful, the token monitor ends the application 9600 via the application terminator. Additionally, the token monitor comprises a criteria evaluator (e.g. a timer, a counter, a calendar, a heat sensor, and etc.) that determines the expiration of the sub-token. For example, if the sub-token is for Monday thru Friday, the token evaluator will be a calendar that determines the expiration of the sub-token based on what day of the week access is requested.

The above embodiments are only illustrative of the principles of this invention and are not intended to limit the invention to the particular embodiments described. One skilled in the art should recognize that resources could include all types of resources such as software applications, hardware devices, computing machines, and etc. In particular, it is contemplated that functional implementation of the invention described herein may be implemented equivalently in hardware, software, firmware, and/or other available functional components or building blocks. Accordingly, various modifications, adaptations, and combinations of various features of the described embodiments can be practiced without departing from the scope of the invention as set forth in the appended claims.

We claim:

1. A system comprising:
   a content subscriber configured to request content;
   a plurality of content publishers, wherein at least one content publisher of the plurality of content publishers comprises a component manager configured to obtain a role associated with the at least one content publisher and wherein the component manager is configured to download, install, and configure a feature on the at least one content publisher using role;
   a content locator, in response to the request, configured to locate and activate the feature on the at least one content publisher to provide the requested content, wherein activating the feature on at least one content publisher comprises using a licensing manager to determine whether the content subscriber can access the feature; and
   the license manager configured to control access of the content subscriber to the feature on the at least one content publisher.

2. The system of claim 1, wherein the license manager is configured to generate at least one token based on a policy instance associated with the content subscriber and wherein a token monitor located on the at least one content publisher is configured to initiate access to the feature.

3. The system of claim 2, wherein the policy instance is based on user licensing criteria.

4. The system of claim 2, wherein the policy instance is based on licensing criteria associated with the feature.

5. The system of claim 2, wherein the policy instance is based on a combination of user licensing criteria and licensing criteria associated with the feature.

6. The system of claim 1, wherein the content locator is configured to locate the at least one content publisher by matching an attribute of the at least one content publisher with an attribute of the requested content.

7. The system of claim 6, wherein the attribute of the at least one content publisher is matched to an attribute of a user.

8. The system of claim 1, further comprising:
   a performance driver configured to change a configured parameter of the feature based on a performance level of the feature on the at least one content publisher.

9. The system of claim 1, further comprising:
   a system database configured to store configuration parameters, wherein the configuration parameters are associated with the role and used to configure the feature.

10. The system of claim 9, wherein the system database is configured to store the policy instance.

11. The system of claim 9, wherein the system database is configured to store attributes associated with at least one selected from a group consisting of the content subscriber, the content locator, and the at least one content publisher.

12. A method for managing access of a content subscriber comprising:
   receiving a request for content from the content subscriber;
   determining, by a content locator, at least one content publishing resource required to provide the content;
   directing said request to a content publisher having the at least one content published resource;
   activating the at least one content publishing resource using at least one token provided by a license manager;
   upon activation generating the content using the at least one content publishing resource and providing the content to the content subscriber,
   wherein the content publisher comprises a component manager configured to obtain a role associated with the content publisher and wherein the component manager is configured to download, install, and configure the at least one content publishing resource on the content publisher using the role.

13. The method of claim 12, further comprising:
   creating at least one policy instance associated with the content subscriber;
   generating at least one token by the license manager based on the at least one policy instance,
   wherein the at least one token is used to activate the content publishing resource.

14. The method of claim 13, wherein the policy instance is based on licensing criteria associated with the content publishing resource.

15. The method of claim 12, further comprising:
   updating the configuration of the content publishing resource using at least one configuration parameter, wherein the at least one configuration parameter is dynamically uploaded onto the content publisher on which the content publishing resource is executing.

* * * * *